H. B. ALLEN.
Ink-Fountain for Printing-Presses.
No. 130,176. Patented Aug. 6, 1872.
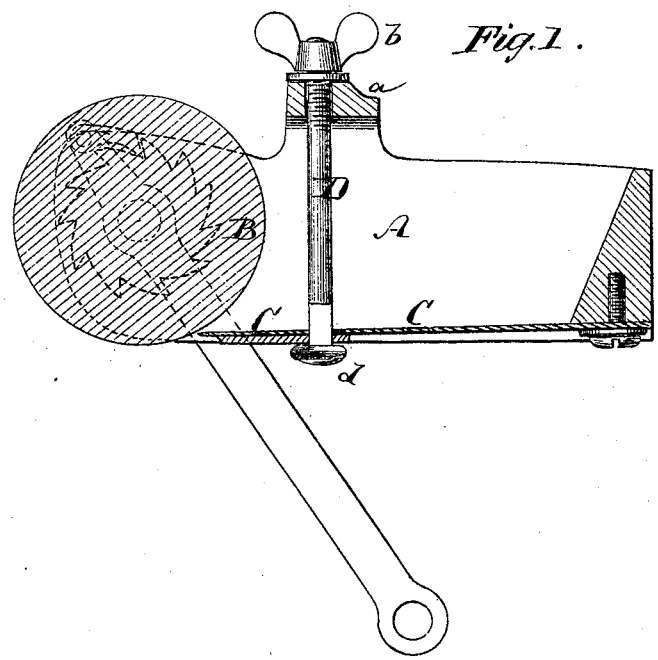
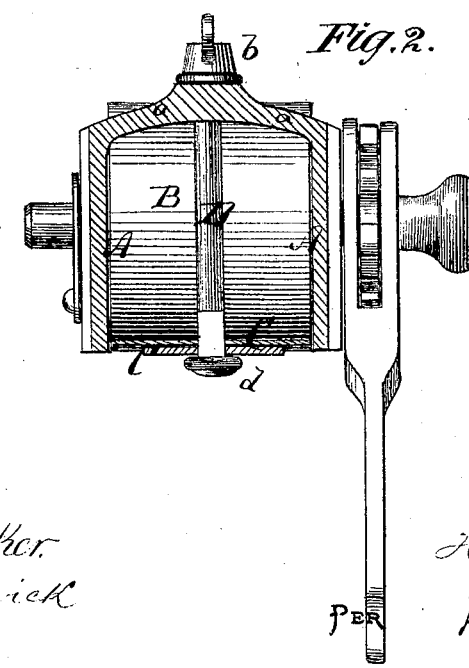

UNITED STATES PATENT OFFICE.

HENRY B. ALLEN, OF BROOKLYN, NEW YORK.

IMPROVEMENT IN INK-FOUNTAINS FOR PRINTING-PRESSES.

Specification forming part of Letters Patent No. 130,176, dated August 6, 1872.

Specification describing a new and Improved Ink-Fountain for Printing-Presses, invented by HENRY B. ALLEN, of Brooklyn, in the county of Kings and State of New York.

In the accompanying drawing, Figure 1 is a longitudinal vertical section of my improved ink-fountain. Fig. 2 is a vertical transverse section of the same.

Similar letters of reference indicate corresponding parts.

This invention has for its object to facilitate the adjustment of the bottom of an ink-fountain during operation of the press with which the same is connected.

Ink-fountains having adjustable bottoms were heretofore provided with screws beneath the bottoms for regulating the same and thereby controlling the efflux of ink. It was difficult to reach the screws under the fountain, and occasioned at times injury to the hands of the attendants, which were jammed between the fountain and the ink-disk.

My invention consists in applying the screw by which the bottom of the fountain is adjusted above the bottom through a bridge that extends across the top of the fountain. The screw or the nut thereon is thereby exposed and in convenient position for adjustment.

A in the drawing represents the body or case of the ink-fountain. B is the feed-roller; C, the adjustable bottom of the same. The bottom is either hinged or in the form of a spring-plate, as shown. D is a screw extending through the bottom C and through a transverse bridge, $a$, which is formed over the body A, as shown. A nut, $b$, is applied to the upper end of the screw D, above the bridge $a$. The lower end of the screw has a head, $d$, beneath the bottom C. Thus, by turning the nut, the screw will be drawn up or let down, and the bottom C consequently regulated in the desired manner. Instead of having the nut $b$ and head $d$ the screw may be screwed into the bottom C and swiveled in the bridge $a$, so that the bottom will be adjusted in an equivalent manner whenever the screw is turned by means of a knob or handle at the upper end.

Having thus described my invention, I claim as new and desire to secure by Letters Patent—

The ink-fountain provided with the bridge $a$, and with the screw D extending through said bridge and through the adjustable bottom C, substantially as herein shown and described.

HENRY B. ALLEN.

Witnesses:
A. V. BRIESEN,
T. B. MOSHER.